(12) United States Patent
Lin et al.

(10) Patent No.: US 7,627,973 B2
(45) Date of Patent: Dec. 8, 2009

(54) FRAME STRUCTURE ADAPTED TO DIFFERENT DISPLAY PANEL THICKNESSES AND CORRESPONDING ENGAGING DEVICE

(75) Inventors: Wen-Pin Lin, Taipei Country (TW); Kuan-Cheng Hsieh, Keelung (TW); Wen-Hung Huang, Taipei County (TW)

(73) Assignee: Hannspree, Inc., Taipei (TW)

( * ) Notice: Subject to any disclaimer, the term of this patent is extended or adjusted under 35 U.S.C. 154(b) by 251 days.

(21) Appl. No.: 11/879,823

(22) Filed: Jul. 18, 2007

(65) Prior Publication Data
US 2008/0276516 A1 Nov. 13, 2008

(30) Foreign Application Priority Data
Mar. 12, 2007 (TW) .............................. 96108472 A

(51) Int. Cl.
A47G 1/06 (2006.01)
(52) U.S. Cl. .............................. 40/797; 40/794; 40/781; 40/740; 24/297; 24/336
(58) Field of Classification Search .................. 40/797, 40/740, 739, 796, 781, 611.13; 24/439, 593.1, 24/440, 453, 297; 411/510
See application file for complete search history.

(56) References Cited

U.S. PATENT DOCUMENTS

| | | | | |
|---|---|---|---|---|
| 3,979,796 A | * | 9/1976 | MacDonald | .................. 49/463 |
| 4,356,601 A | * | 11/1982 | Kimura | ......................... 24/297 |
| 4,762,437 A | * | 8/1988 | Mitomi | ......................... 403/11 |
| 4,949,483 A | * | 8/1990 | Dobson et al. | ................. 40/740 |
| 5,448,809 A | * | 9/1995 | Kraus | ........................... 24/297 |
| 5,706,559 A | * | 1/1998 | Oliver et al. | ................... 267/49 |
| 5,947,631 A | * | 9/1999 | Hironaka et al. | ............. 403/397 |
| 6,694,683 B2 | * | 2/2004 | Anderson et al. | ........... 52/204.5 |
| 7,186,068 B2 | * | 3/2007 | Zoubek et al. | ............... 411/510 |

\* cited by examiner

Primary Examiner—Lesley Morris
Assistant Examiner—Kristina Staley
(74) Attorney, Agent, or Firm—Haverstock & Owens LLP

(57) ABSTRACT

A frame structure disposing thereon a specific one of plural display panels having at least a first thickness and a second thickness is provided. The frame structure includes a receptacle disposing thereon the specific display panel having a specific thickness equivalent to one of the first and second thicknesses, a set of first fastening elements, each of which includes a first protrusion, and a set of second fastening elements, each of which includes a second protrusions, wherein the sets of first fastening elements and second fastening elements are peripherally disposed around the receptacle, each of the first protrusions has a height corresponding to the first thickness and each of the second protrusions has a height corresponding to the second thickness, whereby the specific display panel is fastened by one of sets of the first and second protrusions having the respective height corresponding to the specific thickness.

11 Claims, 6 Drawing Sheets

FRAME STRUCTURE ADAPTED TO DIFFERENT DISPLAY PANEL THICKNESSES AND CORRESPONDING ENGAGING DEVICE

FIELD OF THE INVENTION

The present invention is related to a frame structure and a corresponding engaging device, and more particularly to a frame structure adapted to different display panel thicknesses and a corresponding engaging device.

BACKGROUND OF THE INVENTION

Nowadays, a display device generally includes a front cover, a display panel and a back cover. During assembling the display device, the display panel is pre-fixed in the front cover for orientating the display panel and then the back cover is disposed thereon. The back cover includes a plurality of assembled holes for fastening with corresponding screw holes through screws.

Please refer to FIGS. 1 and 2, which are respective schematic views showing a front cover structure of a display device and the front cover structure disposing thereon a display panel according to the prior art. The conventional front cover structure of the display device includes a display front cover 10, a receptacle 11 and a plurality of fastening elements 12, in which the receptacle is used for disposing thereon a display panel 13. Further, the fastening elements 12 are peripherally disposed around the receptacle 11, and each of the fastening elements 12 has a protrusion 121. The display panel 13 could be fastened by the protrusions 121. Thus, the mentioned functions for pre-fixing and orientating the display panel 13 would be achieved.

However, the conventional front cover structure merely is disposed thereon a single dimensional display panel, which includes a fixed length, width and thickness, by the present module design. The single dimensional display panel often includes the same length and width, but different single dimensional display panels usually include different thicknesses according to different types or different manufactories of the display panel.

Accordingly, the present improvement is to provide a change-core manufacturing process during casting the molds of the front cover structure to respectively manufacture different front cover structures having fastening elements with different heights corresponding to the thicknesses of the display panels for different types or different manufactories. Nevertheless, the manufacturing cost for casting the molds could be increased and the commonality of the molds makes worse.

Therefore, the purpose of the present invention is to develop a frame structure adapted to different display panel thicknesses and a corresponding engaging device to deal with the above situations encountered in the prior art.

SUMMARY OF THE INVENTION

It is therefore a first aspect of the present invention to provide a frame structure adapted to different display panel thicknesses and a corresponding engaging device by providing an engaging device adapted to a dimensional diversity of a display panel, so that the display panel is fastened thereby.

It is therefore a second aspect of the present invention to provide a frame structure adapted to different display panel thicknesses and a corresponding engaging device. Accordingly, the manufacturing cost for casting the molds of the display device could be reduced, and the effects for fastening a specific one of display panels having the same size but including different thicknesses would be further achieved.

It is therefore a third aspect of the present invention to provide a frame structure adapted to different display panel thicknesses and a corresponding engaging device to provide two sets of protrusions having different heights. Accordingly, while a thicker display panel is disposed on the frame structure, the display panel could be pressed by one set of protrusions with a lower height to assist in fastening the display panel.

According to a fourth aspect of the present invention, a frame structure disposing thereon a specific one of a plurality of display panels having at least a first thickness and a second thickness is provided. The frame structure includes a receptacle disposing thereon the specific one of display panels, the specific one of display panels having a specific thickness equivalent to one of the first thickness and the second thickness, a set of first fastening elements, each of which includes a first protrusion, and a set of second fastening elements, each of which includes a second protrusions, wherein the set of first fastening elements and the set of second fastening elements are peripherally disposed around the receptacle, each of the first protrusions has a height corresponding to the first thickness and each of the second protrusions has a height corresponding to the second thickness, whereby the specific one of display panels is fastened by one of sets of the first and second protrusions having the respective height corresponding to the specific thickness of the specific one of display panels.

Preferably, each of the second fastening elements is integrated into each of the first fastening elements.

Preferably, each of the first fastening elements has an encompassing structure, and each of the second fastening elements is surrounded by the encompassing structure.

Preferably, the first protrusion has the respective height larger than what the second protrusion has, and the first thickness is thicker than the second thickness.

Preferably, the first fastening elements and the second fastening elements are made of plastic elastomers.

Preferably, the set of first fastening elements and the set of second fastening elements are arranged around the receptacle independently.

Preferably, the first protrusion and the second protrusion are respectively perpendicular to the first fastening element and the second fastening element and extended inward into the receptacle.

According to a fifth aspect of the present invention, an engaging device arranged in a frame structure for fastening one of a plurality of display panels having at least a first thickness and a second thickness is provided. The engaging device includes a set of first fastening elements, and a set of second fastening elements, wherein one set of the first and second fastening elements has a parameter corresponding to the first thickness, and the other has a further parameter corresponding to the second thickness, whereby the display panel is fastened by one set of the first fastening elements and the second fastening elements having the respective parameters corresponding to the respective thickness of the display panel.

Preferably, each of the first fastening elements includes a first protrusion and each of the second fastening elements includes a second protrusion, and the respective parameters of the first and second fastening elements corresponding to one of the first and second thicknesses are the respective heights for the first and second fastening elements.

Preferably, the frame structure is a front cover or a back cover for a display device.

According to a sixth aspect of the present invention, a frame structure of a display device for disposing thereon a display panel is provided. The frame structure includes an engaging device adapted to a dimensional diversity of the display panel, so that the display panel is fastened thereby.

Preferably, the engaging device includes a plurality of fastening elements.

Preferably, the plurality of fastening elements includes a plurality of protrusions with different heights.

Preferably, each of the protrusions has a height corresponding to a thickness of the display panel, whereby the display panel is fastened by the fastening elements including a protrusion having the respective height corresponding to the thickness of the display panel.

Preferably, the dimensional diversity is a height diversity.

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENTS

The present invention will now be described more specifically with reference to the following embodiment. It is to be noted that the following descriptions of preferred embodiment of this invention are presented herein for purposes of illustration and description only; it is not intended to be exhaustive or to be limited to the precise form disclosed.

The present invention is applied in a frame structure of a display device with a signal size to provide various sets of fastening elements and/or an engaging device having various parameters adapted to a dimensional diversity of a specific one of a plurality of display panels, thereby disposing thereon the specific one of display panels. The engaging device includes a plurality of fastening elements to form the various sets of fastening elements. Further, the dimensional diversity could be a height diversity or a thickness diversity, i.e. various thicknesses for the display panels, or other possible diversities, and thus the parameter is a height for the fastening element corresponding to the thickness of the display panel. In these preferred embodiments, the present invention provides the fastening elements including a plurality of protrusions with different heights and each of the protrusions has a height corresponding to the respective thicknesses of the display panels. Accordingly, the specific one of display panels would be fastened by one set of fastening elements including the protrusion having the respective height corresponding to the thickness of the specific one of display panels.

Figure 3:
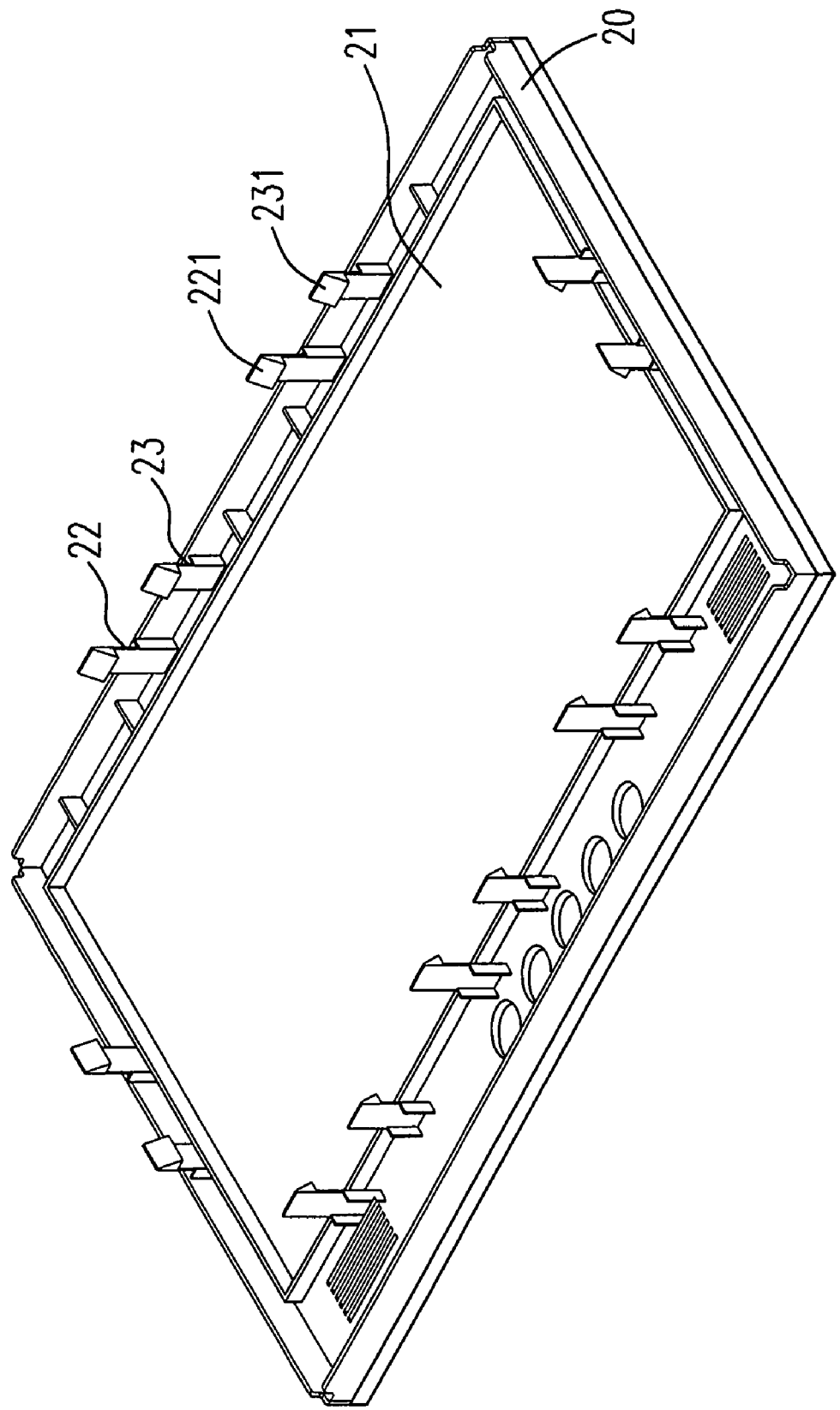
FIG. 3 is a schematic view showing a frame structure and a corresponding engaging device according to a first preferred embodiment of the present invention.

Please refer to FIG. 3, which is schematic view showing a frame structure and a corresponding engaging device according to a first preferred embodiment of the present invention. A frame structure 20 includes a receptacle 21, a set of first fastening elements 22 and a set of second fastening elements 23. The receptacle 21 is used for disposing thereon a display panel (not shown), and the set of first fastening elements 22 and the set of second fastening elements 23 are arranged around the receptacle 21 independently. Further, each of the first fastening elements 22 includes a first protrusion 221 arranged in a top portion thereof and each of the second fastening elements 23 includes a second protrusion 231 arranged in a top portion thereof. The first protrusion 221 and the second protrusion 231 are respectively perpendicular to the first fastening element 22 and the second fastening element 23 and extended inward into the receptacle 21. In FIG. 3, the height for the first fastening element 22 is larger than the height for the second fastening element 22, so that the first protrusion 221 has the respective height larger than what the second protrusion 231 has.

Thus, the present invention provides two sets of fastening elements 22, 23 having the respective protrusions 221, 231 with different heights corresponding to two kinds of display panel thicknesses. Further, a specific one of display panels having at least a first thickness and a second thickness could be fastened by one of sets of the first and second protrusions 221, 231 having the respective height corresponding to the specific thickness of the specific one of display panels.

Figure 4:
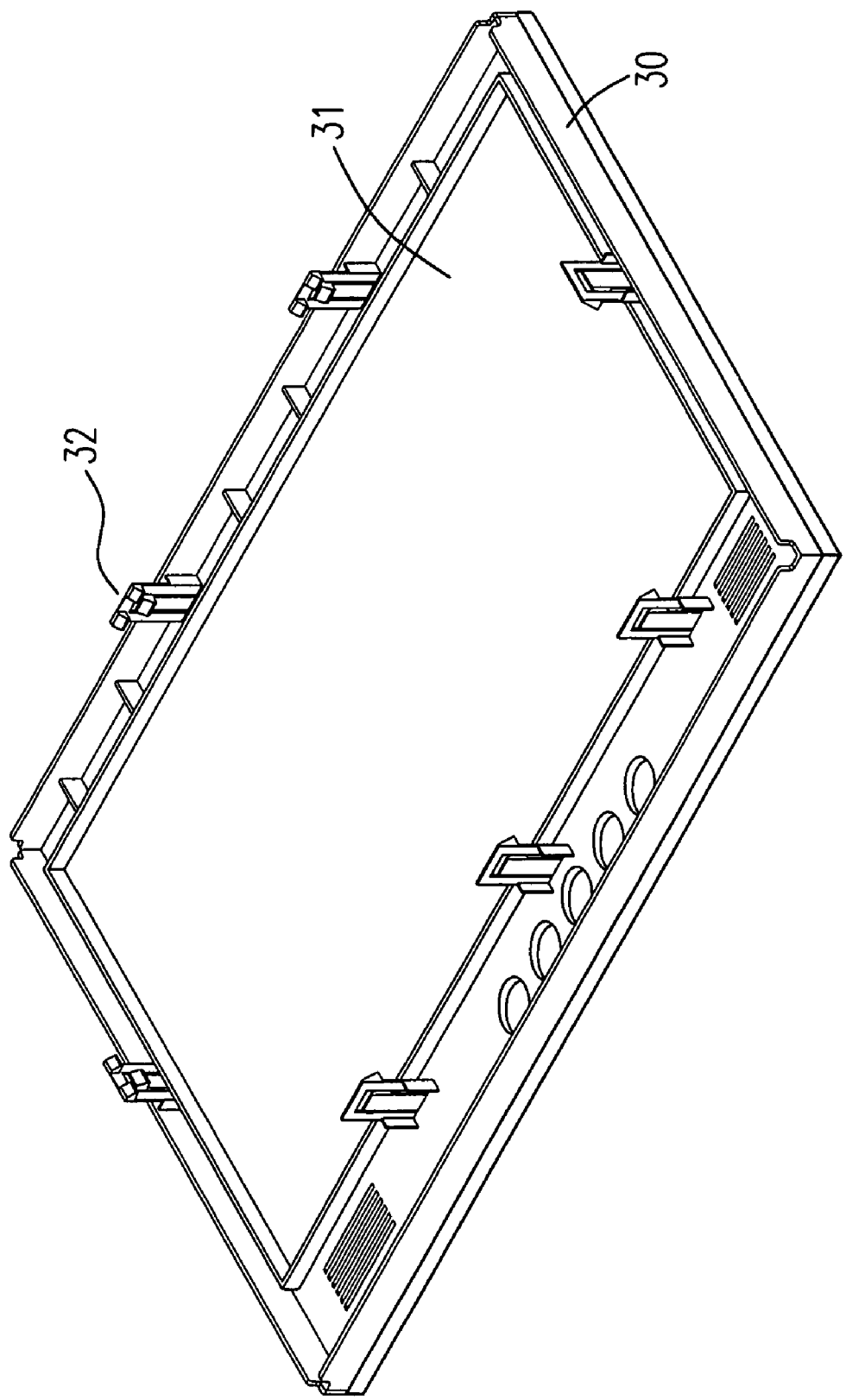
FIG. 4 is a schematic view showing a frame structure and a corresponding engaging device according to a second preferred embodiment of the present invention.

Please refer to FIG. 4, which is a schematic view showing a frame structure and a corresponding engaging device according to a second preferred embodiment of the present invention. Compared with FIG. 3, a frame structure 30 of FIG. 4 includes a plurality of engaging device 32 arranged around a receptacle 31.

Figure 1:
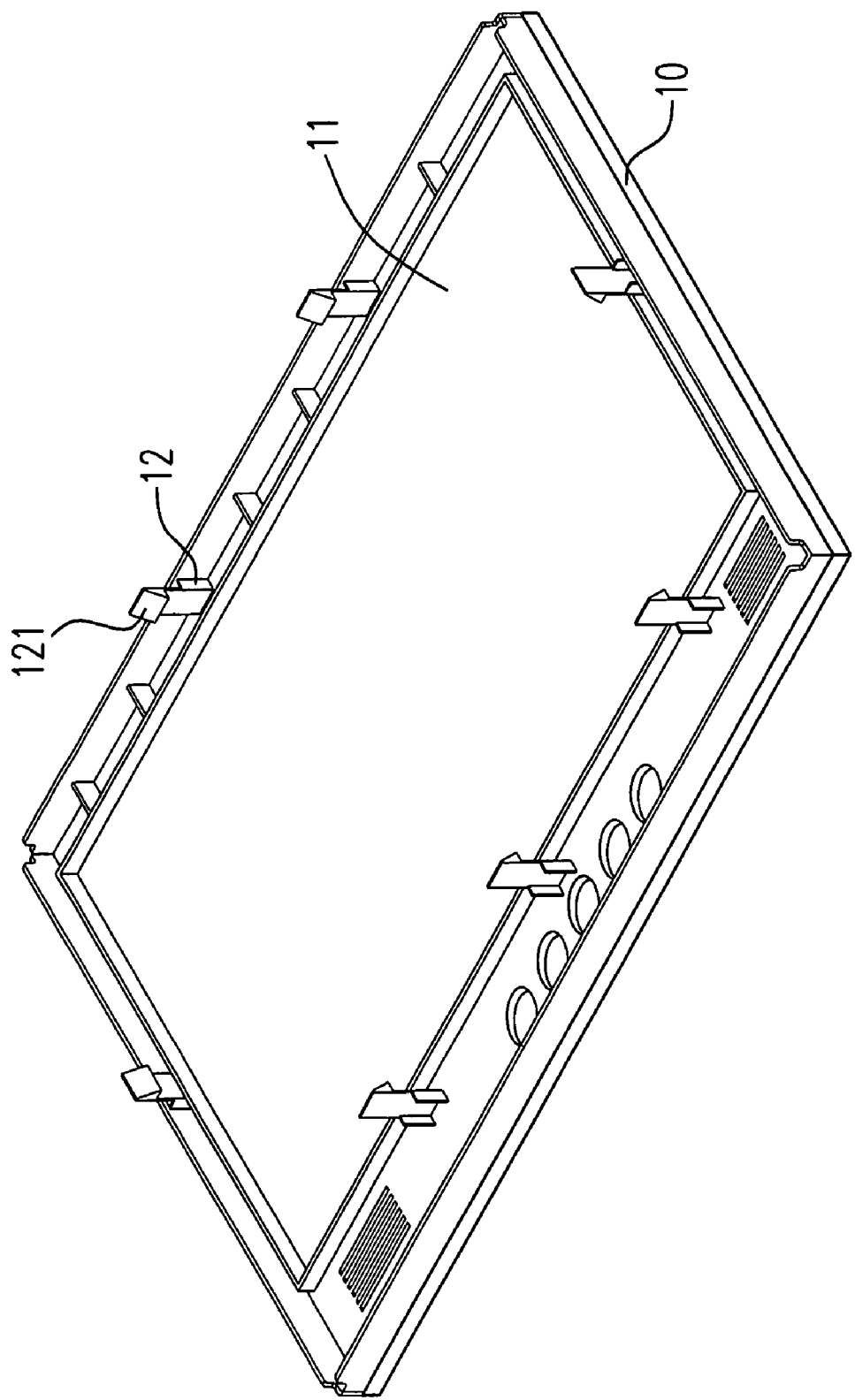
FIG. 1 is a schematic view showing a front cover structure of a display device according to the prior art.
Figure 2:
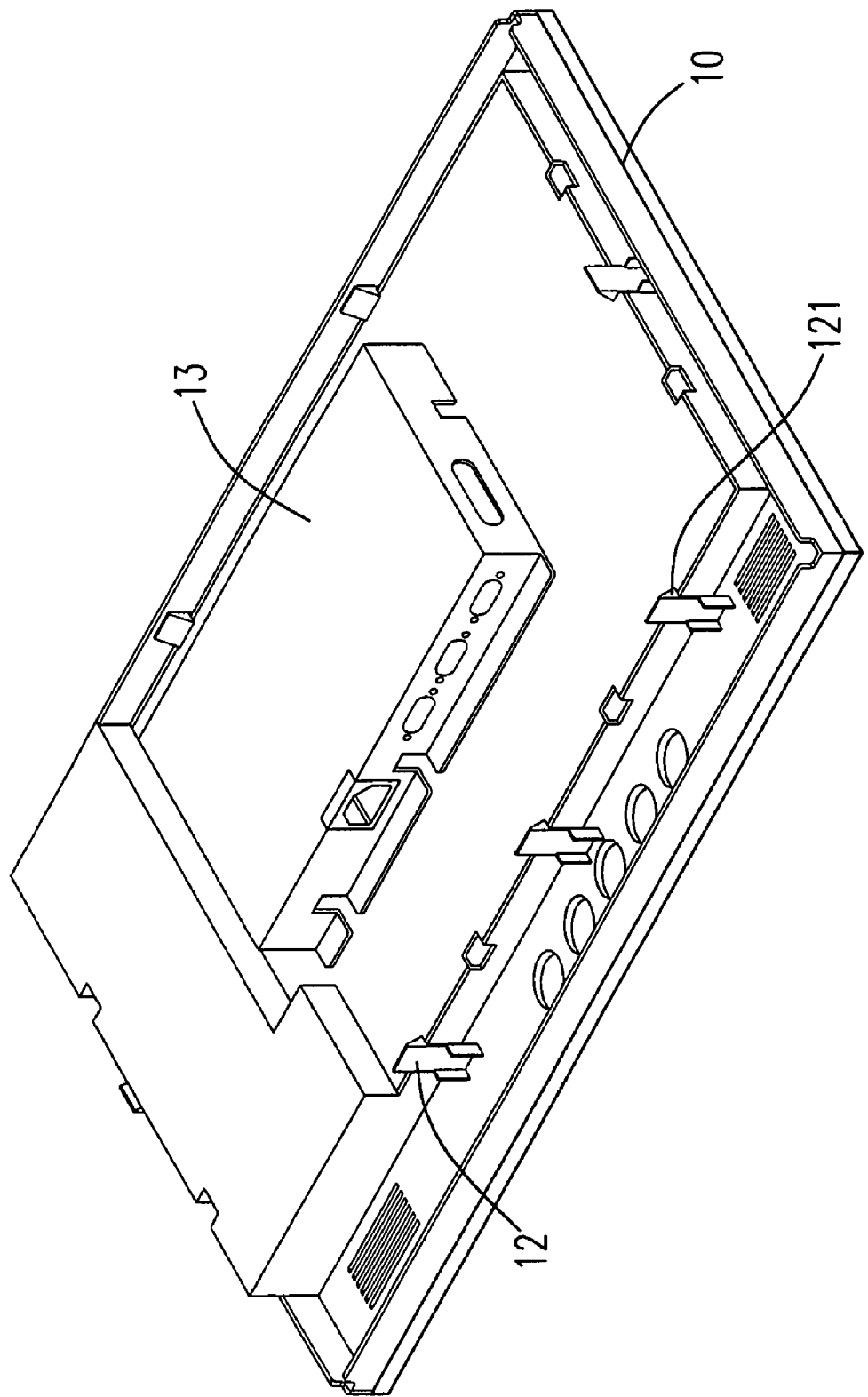
FIG. 2 is a schematic view showing the front cover structure disposing thereon a display panel according to the prior art.
Figure 5:
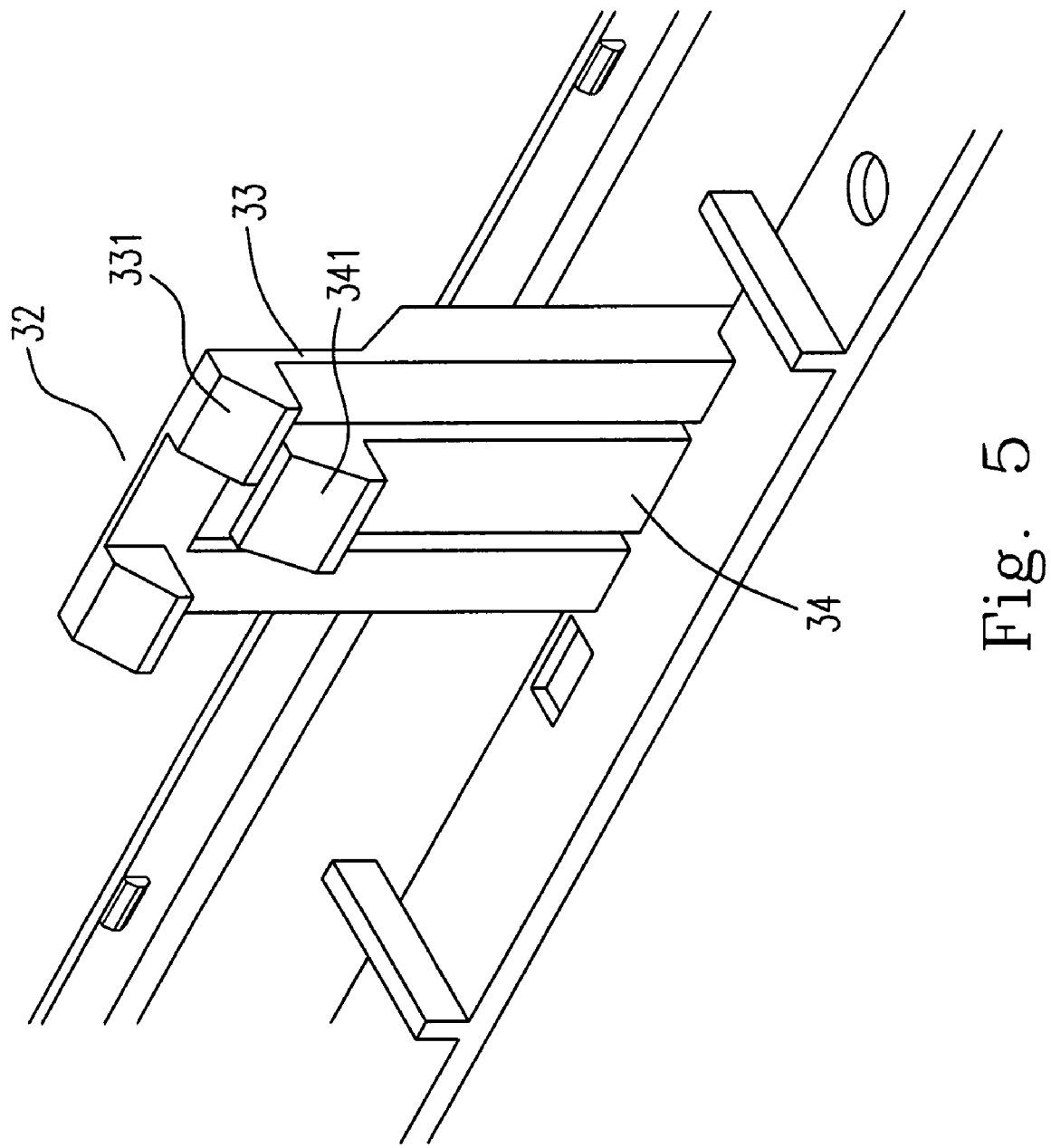
FIG. 5 is a schematic view showing the engaging device shown in FIG. 4.

Moreover, a detail view of the engaging device 32 in FIG. 4 is shown in FIG. 5. The engaging device 32 includes a first fastening element 33 and a second fastening element 34, and the second fastening elements 34 is integrated into the first fastening element 33. Further, the first fastening element 33 has an encompassing structure, and the second fastening element 34 is surrounded by the first fastening element 33. As the same with the first preferred embodiment of the present invention, i.e. FIG. 2, the first fastening elements 33 includes a first protrusion 331 and the second fastening element 34 includes a second protrusion 341. The first protrusion 331 has the respective height larger than what the second protrusion 341 has. Accordingly, the frame structure 30 of the second preferred embodiment is equivalent to the frame structure 20 of the first preferred embodiment, which is used for fastening one of a plurality of display panels having at least a first thickness and a second thickness corresponding to the first protrusion 331 and the second protrusion 341, respectively.

Figure 6:
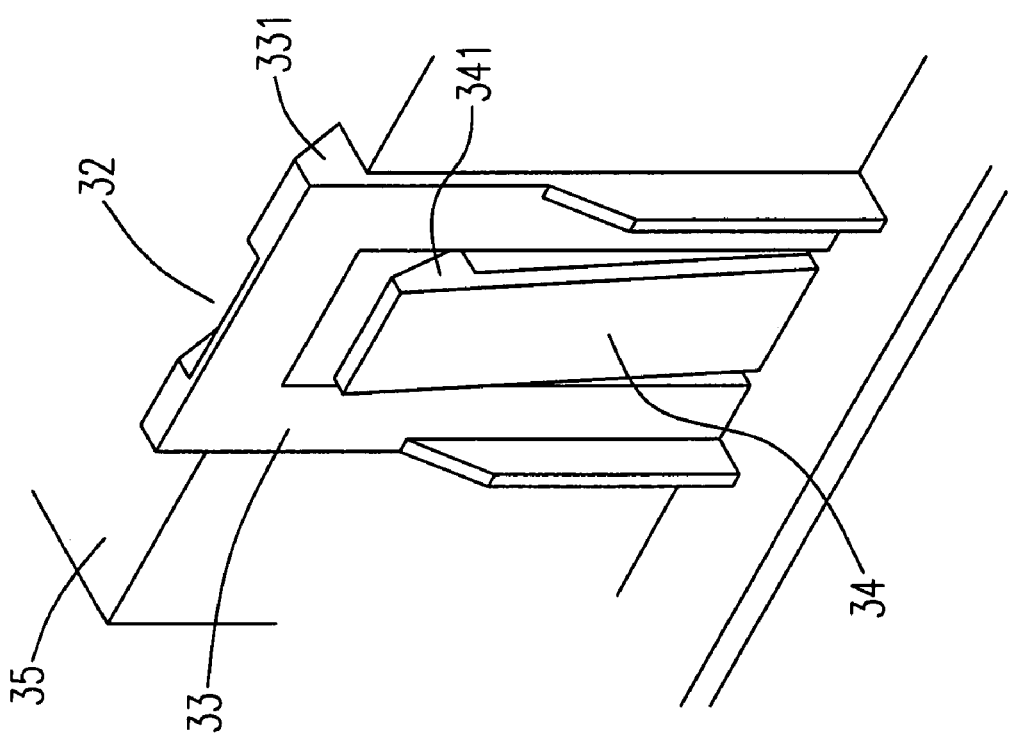
FIG. 6 is a partial schematic view showing the engaging device of FIG. 5 adapted to a thicker display panel.

Besides, the fastening elements 22, 23, 33, 34 are made of plastic elastomers, which include some elasticity. Further, take an example for the second preferred embodiment. Please refer to FIG. 6. While disposing a thicker display panel 35 on the frame structure (not shown), the thicker display panel 35 would be fastened by the first protrusion 331 with a higher height. In addition, the second protrusion 341 of the second fastening element 34 would be slanted via the thicker display panel 35, so that the thicker display panel 35 could be pressed by the second protrusion 341 to assist in fastening the thicker display panel 35.

The respective frame structures 20, 30 are either a front cover for a display device or a back cover for the display device. Thus, the display panel can be disposed on the front cover or the back cover to be orientated and pre-fixed. Then, the front cover and the back cover would be fastened by screws to fabricate the assembly of the display device. Moreover, the mentioned assembly process is implemented according to a thicker display panel. While assembling a thinner display panel with the front cover, a spacer could be added between the thinner display panel and the back cover. According to the mentioned description, there are merely two preferred embodiments to provide two different sets of fastening elements or an engaging device having two different protrusions with different heights corresponding to the display panel with two different thicknesses. However, these independent fastening elements of the first preferred embodiment or the engaging device having two fastening elements in the second preferred embodiment could be suitable for a single frame structure of the display device at the same time. Furthermore, the present invention could provide more kinds of fastening elements or engaging device having more various parameters adapted to the dimensional diversity, such as the thickness diversity, of the display panel according to the mentioned conception.

Therefore, it is understood that the present frame structure adapted to different display panel thicknesses and the present corresponding engaging device could provide an integrated frame structure of the display device adapted to different display panels with the same size but including different thicknesses. The present frame structure includes an engaging device or different sets of fastening elements having respective set of protrusions with different heights corresponding to different thicknesses of the display panel, respectively. While a thicker display panel is disposed on the frame structure, the display panel could be pressed by one set of protrusions with a lower height to assist in fastening the display panel. Furthermore, the present invention would be easily integrated into the exist molds manufacturing process for the display device, and thus the manufacturing cost for the molds could be reduced and the recycle ability for the molds would be further enhanced.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A frame structure disposing thereon a specific one of a plurality of display panels having at least a first thickness and a second thickness, the frame structure comprising:
   a receptacle disposing thereon the specific one of display panels, the specific one of display panels having a specific thickness equivalent to one of the first thickness and the second thickness;
   a set of first fastening elements, each of which includes a first protrusion and has an encompassing structure; and
   a set of second fastening elements, each of which includes a second protrusions and is surrounded by the encompassing structure,
   wherein the set of first fastening elements and the set of second fastening elements are peripherally disposed around the receptacle, each of the first protrusions has a height corresponding to the first thickness and each of the second protrusions has a height corresponding to the second thickness, whereby the specific one of display panels is fastened by one of sets of the first and second protrusions having the respective height corresponding to the specific thickness of the specific one of display panels.

2. The frame structure according to claim 1, wherein each of the second fastening elements is integrated into each of the first fastening elements.

3. The frame structure according to claim 1, wherein the first protrusion has the respective height larger than what the second protrusion has.

4. The frame structure according to claim 3, wherein the first thickness is thicker than the second thickness.

5. The frame structure according to claim 1, wherein the first fastening elements and the second fastening elements are made of plastic elastomers.

6. The frame structure according to claim 1, wherein the set of first fastening elements and the set of second fastening elements are arranged around the receptacle independently.

7. The frame structure according to claim 1, wherein the first protrusion and the second protrusion are respectively perpendicular to the first fastening element and the second fastening element and extended inward into the receptacle.

8. An engaging device arranged in a frame for fastening one of a plurality of display panels having at least a first thickness and a second thickness, the engaging device comprising:
   a set of first fastening elements, each of which has an encompassing structure; and
   a set of second fastening elements, each of which is surrounded by the encompassing structure,
   wherein one set of the first and second fastening elements has a parameter corresponding to the first thickness, and the other has a further parameter corresponding to the second thickness, whereby the display panel is fastened by one set of the first fastening elements and the second fastening elements having the respective parameters corresponding to the respective thickness of the display panel.

9. The engaging device according to claim 8, wherein each of the first fastening elements includes a first protrusion and each of the second fastening elements includes a second protrusion, and the respective parameters of the first and second fastening elements corresponding to one of the first and second thicknesses are the respective heights for the first and second fastening elements.

10. The engaging device according to claim 8, wherein the frame is a front cover for a display device.

11. The engaging device according to claim 8, wherein the frame is a back cover for a display device.

\* \* \* \* \*

UNITED STATES PATENT AND TRADEMARK OFFICE
CERTIFICATE OF CORRECTION

| | | |
|---|---|---|
| PATENT NO. | : 7,627,973 B2 | Page 1 of 1 |
| APPLICATION NO. | : 11/879823 | |
| DATED | : December 8, 2009 | |
| INVENTOR(S) | : Lin et al. | |

It is certified that error appears in the above-identified patent and that said Letters Patent is hereby corrected as shown below:

Title Page, Item (75) Inventors, please replace "Country" with "County" so that the first line correctly reads:

-- (75) Inventors: Wen-Pin Lin, Taipei County (TW); --

Signed and Sealed this

Twelfth Day of January, 2010

David J. Kappos
*Director of the United States Patent and Trademark Office*